July 14, 1936.  B. FRIEDMAN  2,047,261
DISPENSING AND MEASURING CONTAINER
Filed April 2, 1935
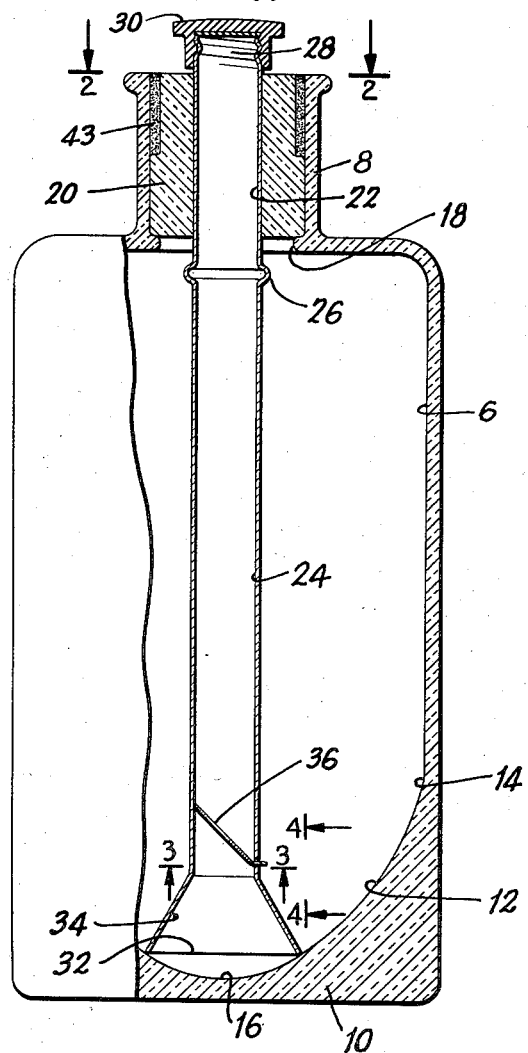
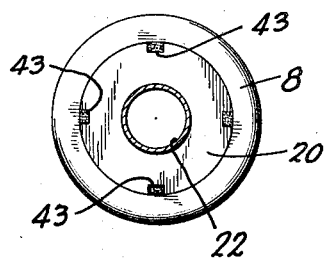
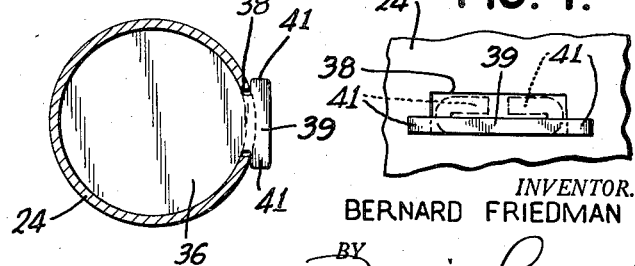
INVENTOR.
BERNARD FRIEDMAN
BY
Frederick Griswold Jr.
ATTORNEY Patented July 14, 1936

2,047,261

UNITED STATES PATENT OFFICE 2,047,261

DISPENSING AND MEASURING CONTAINER

Bernard Friedman, New York, N. Y.

Application April 2, 1935, Serial No. 14,201

7 Claims. (Cl. 221—98)

This invention relates to dispensing containers adapted to dispense a measured quantity of substance at each dispensing operation.

Individual doses of some medicinal preparations, such as effervescent salts, are purchased, frequently, at the soda fountains of drug stores and the like. Where such preparations are marketed in bottles, under a trade name, and asked for as such, experience shows that they are often adulterated or the bottles refilled with spurious imitations of the original substance. Moreover, materials, such as effervescent salts, are likely to clog known measuring and dispensing devices so that they cannot be readily dispensed thereby.

The present invention is designed to prevent the substitution or adulteration of substances in dispensing containers and to deliver exactly measured quantities or doses therefrom.

One object of the invention is a dispensing device whereby delivery of the contents may be obtained in exactly measured quantities, irrespective of the characteristics of the material delivered.

Another object of the invention is a dispensing container wherein the movement of the material to the measuring instrumentality is facilitated.

In accordance with these aspects of the invention, a dispensing container, having a reciprocating measuring tube, is provided with a concave surface toward the lowermost point of which the material will tend to flow for inclusion within the end of the measuring tube.

It is also an object of the invention to provide a dispensing device which cannot be refilled. To this end, means are provided permitting the passage of material in the tube only in one direction, that is, toward the delivery end of the tube.

The invention also seeks, in a delivery tube having valve means, that the tube cannot become clogged. To this end, the valve controlling the direction of flow in the delivery tube is so constructed and arranged as not to obstruct the free flow of the material. More specifically, the valve means comprises a flap valve, pivotally mounted in a wall of the tube, and movable in a direction toward the bottom of the container to close the passage but movable in the opposite direction to substantially fully open the passage for the free flow of the material.

Yet another object of the invention is the provision of a dispensing container which may be made of vitreous material or the like, in an inexpensive and convenient manner. To this end, a bottle of vitreous material is provided, the neck or mouth of which may be closed, as by means of a stopper, also of vitreous material, through which the dispensing tube passes, means being provided to facilitate the securing of the stopper in the neck of the bottle. Accordingly one or the other or both of the coacting surfaces of the stopper and bottle is or are conveniently formed with recesses into which material may be introduced which will adhere to or unite with both the bottle and the stopper to firmly and irremovably secure the latter in position.

The invention also seeks a dispensing container which is practical from the standpoint of ease and cheapness of manufacture and convenience in use.

These and other objects of the invention and the means for their attainment will be more apparent from the following detailed description, taken in connection with the accompanying drawing illustrating one embodiment by which the invention may be realized, and in which:

Figure 1 is a view partly in elevation and partly in section in a vertical, axial plane showing a bottle of vitreous material, such as glass, to which the invention is applied;

Figure 2 is a transverse, sectional view taken in the plane indicated by the line 2—2 of Figure 1, looking in the direction of the arrows, and showing the method of securing the stopper in position;

Figure 3 is a transverse, sectional view taken in the plane indicated by the line 3—3 of Figure 1, looking in the direction of the arrows, and showing the valve means in the delivery tube; and Figure 4 is a view in side elevation of a fragmentary portion of the delivery tube showing the pivoting of the valve means.

In the illustrated embodiment, the container for the measuring device takes the form of a bottle 6 having the usual neck 8 of substantially cylindrical form and the bottom 10 is formed, inwardly, as a concave surface 12, the highest point 14 being at the periphery of the container and the lowest point being conveniently, although not necessarily, on the axis of the bottle, as shown at 16. At least, this lowest point 16 is coaxial with the delivery tube 24. The container is conveniently molded of a vitreous material, such as glass, so that the bottom surface 12 increases progressively outwardly and upwardly in height above a transverse plane, from a low point 16 to the highest elevation at the periphery.

As shown, at the mouth of the bottle, a head or flange 18 may be provided to support a closure or stopper although it will be obvious that the same results may be obtained, for instance, if the stopper were frusto-conical in shape with the interior wall of the neck 8 similarly shaped to cooperate therewith and support the stopper. The stopper is also formed of vitreous material, such as glass, as indicated at 20, and the outer periphery of the stopper is adapted to fit closely the interior surface of the neck 8. The stopper 20 is conveniently formed with a bore 22 which, in the illustrated embodiment, is axially disposed and is adapted to receive the dispensing tube 24 now to be described.

In the illustrated embodiment, the dispensing tube is illustrated as a tubular and preferably metallic member 24, conveniently circular in cross section, and slidable within the bore to a predetermined extent. The extent of axial movement is determined by a stop conveniently formed as a bead pressed outwardly in the wall of the tube as shown at 26. The tube 24 is of such length as to contact at its lower end with the surface 12, i. e., the bottom of the bottle and when so doing have a portion 28 at the upper end thereof extending without the stopper for delivery of the material, as will be understood. This upper end 28 may conveniently be closed, as by a cap 30 illustrated as screwed on to the end of the tube. The tube has a sliding fit within the bore 22 of the stopper 20 so as to substantially exclude moisture but at the same time permit the tube to be moved downwardly in an axial direction so that its lower end or edge 32 will contact with the surface 12. The edge 32 obviously should have substantially a line contact with the surface 12. Thus when the tube 24 is raised until the stop 26 abuts the bottom end of the stopper 20, a space is provided between the edge 32 and the surface 12 whereby material may flow to the lowermost portion of the bottom. The downwardly inclined walls of the surface facilitate the flow of this material and thus is particularly advantageous for use with effervescent salts and the like. Then when the tube is moved downwardly until the edge 32 contacts with the surface 12, a predetermined measured quantity of material is enclosed by the end of the tube and when the bottle is inverted, such material will readily flow through the tube 24 and out of the mouth 30 thereof.

In the illustrated embodiment, the lower end of the tube is shown as flaring outwardly, for instance, in the frusto-conical shape shown at 34. This not only facilitates the selection of the desired quantity, but, by a proper proportion of the parts, permits the desired quantity to be obtained, and also by the inclination of the walls, facilitates the flow of the material.

It is also desirable to prevent the refilling of the container 6 and to this end means are provided which limit the flow of material in the tube 24 to flow in one direction. As shown, a flap valve 36 pivotally mounted at one side of the passage 24 is free to move toward the mouth of the bottle to open the passage but, when the valve falls in the other direction, it closes the passage as shown in Figure 1, so that no material can ever enter the bottle through the tube. The flap 36 is conveniently substantially elliptical so that in the position shown in Figure 1, it will completely close the passage. When the bottle is inverted, the plane of the flap 36 will be parallel to the elements of the tube 24, thus opening the passage for the flow of material, as will be understood.

This valve member 36 may readily be inserted and mounted for movement in the tube 24 by the provision of a transverse slot 38 formed in the wall 24 of the tube through which a tongue 39 on the flap 36 may pass. At each side of the tongue 39 in spaced relation to the flap 36 are tabs or fins 41 which may be bent inwardly to overlie the tongue 39 whereby the structure may pass freely through the slot 38 and then be bent outwardly in the plane of the tongue as shown in Figure 4 to lie outside of the tube and prevent displacement of the flap valve 36.

Various means may be provided for irremovably securing the stopper 20 in the neck of the bottle. As shown, recesses may be formed in one of the two coacting surfaces, preferably in the stopper, as indicated at 43. One or a plurality of such recesses are provided and these recesses may be either wholly in the stopper or wholly in the neck of the bottle or certain of them may be in the bottle and certain of them in the stopper. After the tube has been assembled in the stopper and the stopper inserted in place, the recesses 43 may be filled with a cementitious material or a vitreous material in molten condition which will adhere or unite with the material of the neck 8 and the stopper 20 to fix the stopper in position and prevent its removal. The stopper, of course, is secured in place after the bottle has been filled with the material to be dispensed.

Various modifications will occur to those skilled in the art in the configuration, composition and disposition of the component elements going to make up the invention as a whole as well as the selection and use of component elements as desired and in the type of valve means used in the tube, and no limitation is intended by the phraseology of the foregoing description or illustrations in the accompanying drawing except as indicated in the appended claims.

What is claimed is:—

1. A dispensing device comprising a glass bottle having a concave interior bottom surface, a stopper for said bottle formed with a bore, a tube reciprocating in said bore formed with a flared lower end adapted to contact with the bottom and surround the lowermost portion thereof, means to limit the upward movement of the tube and a flap valve in the tube to prevent passage of material in a downward direction.

2. In a device of the class described, the combination of a container including a neck and a body portion with the body portion provided therein with a storage chamber outlined by a cylindrical wall rounding at its lower end into a concaved bottom, an open end dispensing tube mounted for a limited movement axially in the neck and disposed coaxial with the lowermost point of the concaved bottom, the lower end of the tube being circular and providing a line contact with the concaved bottom concentrically of said lowermost point when in its lowermost position engaging the bottom, and the lower end of the tube coacting with the bottom when the tube is elevated slightly therefrom to form an annular passageway of uniform width between the space beneath the tube and the balance of the storage space to permit the contents of the storage space to flow towards the lowermost point of the bottom from all sides of the tube, the width of said annular passageway being controlled by the displacement of the tube from its position engaging the bottom.

3. A dispensing device provided with a storage space having a rounded concaved bottom surface, a metering tube having a flared lower end adjustably mounted to have two limiting positions, one with the flared end engaging the concaved bottom surface and containing the lowermost point of the bottom and in the other position spaced slightly from the bottom to form an annular passageway leading into the space between the bottom and the flared end of the tube, and said rounded surface acting as a funnel to direct the contents of the storage space downwardly and centrally across the entire circumference of the annular passageway and said tube when in its position engaging the bottom acting to close said annular passageway and thus stop the flow of the contents down said bottom surface while permitting the discharge of the tube contents.

4. A dispensing device comprising a container having a storage space with a concaved bottom surface, a measuring tube including a cylindrical upper part with its lower end flaring outwardly in frusto-conical shape with a circular lower edge forming a line contact with the bottom when in engagement therewith and concentric with the lowermost point of said concaved bottom, and a flap valve in the cylindrical part of the tube in close proximity to the top of the frusto-conical flared lower end and said lower end forming a measuring chamber between the lowermost point of the bottom and the flap valve.

5. In a device of the class described, the combination of a container including a storage space, having a bottom, a metallic measuring tube mounted for reciprocatory movement in the container and provided with an intake end adapted to engage the bottom to close the lower end of the tube, said tube provided adjacent its lower end with a slot, a flap valve in the lower end of the tube and provided with a tongue extending through the slot and forming a hinge connection between the valve and tube, and said tongue provided with an integral tab located outside of the tube and acting to prevent separation of the valve from the tube.

6. In a device of the class described, the combination of a container including a storage space, having a bottom, a metallic measuring tube mounted for reciprocatory movement in the container and provided with an intake end adapted to engage the bottom to close the lower end of the tube, said tube provided adjacent its lower end with a slot, a flap valve in the lower end of the tube and provided with a tongue extending through the slot and forming a hinge connection between the valve and tube.

7. In a device of the class described, the combination of a bottle provided with a neck, a metallic tube for discharging measured amounts of the bottle contents therefrom, means for fixedly mounting the tube to the bottle to prevent its separation therefrom, said means comprising a stopper fitting in the neck of the bottle, said stopper provided centrally thereof with a long bore in which the tube is slidably mounted for axial movement, said tube provided with means for preventing its entire withdrawal from the stopper, and sealing means permanently securing the stopper to the neck of the bottle.

BERNARD FRIEDMAN.